United States Patent
Tannenbaum et al.

[11] Patent Number: 5,901,209
[45] Date of Patent: May 4, 1999

[54] CALLER ID SUBSTITUTION FOR SELECTED TELEPHONE CALLERS

[75] Inventors: David H. Tannenbaum, Dallas; Michael J. Polcyn, Allen, both of Tex.

[73] Assignee: InterVoice Limited Partnership, Reno, Nev.

[21] Appl. No.: 08/766,972

[22] Filed: Dec. 16, 1996

Related U.S. Application Data

[63] Continuation-in-part of application No. 08/730,742, Oct. 15, 1996.

[51] Int. Cl.⁶ .......................... H04M 1/56; H04M 15/00; H04M 3/42; H04M 3/00
[52] U.S. Cl. .......................... 379/142; 379/113; 379/201; 379/200; 379/309; 379/265
[58] Field of Search .................................. 379/111, 112, 379/113, 127, 142, 201, 207, 265, 266, 309, 188, 189, 199, 200

[56] References Cited

U.S. PATENT DOCUMENTS

| | | | |
|---|---|---|---|
| 5,278,894 | 1/1994 | Shaw | 379/230 |
| 5,329,578 | 7/1994 | Brennan et al. | 379/201 |
| 5,343,518 | 8/1994 | Kneipp | 379/355 |
| 5,436,965 | 7/1995 | Grossman et al. | 379/266 |
| 5,570,419 | 10/1996 | Cave et al. | 379/113 |
| 5,590,184 | 12/1996 | London | 379/142 |
| 5,608,786 | 3/1997 | Gordon | 379/100 |
| 5,675,637 | 10/1997 | Szlam et al. | 379/142 |

*Primary Examiner*—Paul Loomis
*Attorney, Agent, or Firm*—Fulbright & Jaworski L.L.P.

[57] ABSTRACT

A system and method for selectively adjusting the caller identification of a calling party based, in party, on parameters associated with adjusting the calling party. Security codes can be used in conjunction with a database to insure that the substituted ID is legitimate. The one embodiment or network based predictive dialer is used to place calls for agents geographically separated from both the network and other agents. The network system instigates a calling campaign where remote agents are connected through the network to called parties where the called party receives the caller ID information pertaining to the calling campaign and not the caller ID of the agent.

36 Claims, 4 Drawing Sheets

FIG. 6

| No. | USER PARAMETER |
|---|---|
| 1 | Call Record Post Card Tag |
| 2 | Call Record Subtype |
| 3 | Call ID |
| 4 | Sequence Number |
| 5 | User Record ID |
| 6 | Call Origination Pseudo-ANI |
| 7 | Call Origination ID |
| 8 | Call Destination ID |
| 9 | Priority |
| 10 | Call Schedule Time |
| 11 | Call Schedule Limit |
| 12 | Phone Number Pointer |
| 13 | Phone Number |
| 14 | Modified Phone Number |
| 15 | Local Line Number |
| 16 | Global Line Number |
| 17 | ApplClass Name |
| 18 | Record Creation Timestamp |
| 19 | Record Completion Timestamp |
| 20 | System Call Result |
| 21 | Application Call Result |
| 22 | Call Type |
| 23 | Reroute Count |
| 24 | Call State |
| 25 | Call Progress Mode |
| 26 | Call Cut Through Map |
| 27 | RNA Timeout |
| 28 | TimeZone Number |
| 29 | Queuing Timeout |
| 30 | Destination Address |
| 31 | Call Processing Report |
| 32 | Application Marker |
| 33 | Application Parameter 1 |
| 34 | Application Parameter 2 |
| | o |
| | o |
| | o |
| | o |

601

CALLER ID SUBSTITUTION FOR SELECTED TELEPHONE CALLERS

RELATED APPLICATIONS

This application is a continuation-in-part of application Ser. No. 08/730,742, filed Oct. 15, 1996 and entitled NETWORK BASED PREDICTIVE DIALING, the disclosure of which is incorporated by reference herein.

TECHNICAL FIELD OF THE INVENTION

This invention relates to a system and method for adjusting the caller identification of certain calls and more particularly to such a system and method used in a centralized or network based application, such as a predictive dialing system providing access to calling agents utilizing general purpose communications devices via a coupled network.

BACKGROUND OF THE INVENTION

There are beginning to be telephone network applications which control telecommunications from a central point. One such application is a centralized predictive dialer. Predictive dialing in general is an established technology, well known in the art, which deals with placing calls at a rate that will minimize calling agent idle time. Essentially a predictive dialer will screen out busy calls, calls which ring with no answer, or machine answered calls, only connecting live answered calls to a calling agent or customer service representative. It is integral to the effort to optimize the efficiency of the calling agent to relieve him/her of dealing with ring no answer, busy and calls otherwise unsuccessful in contacting a human.

A major advantage of predictive dialing systems is the ability to average the efficiency of a pool of calling agents or customer service representatives. In large outbound call centers such averaging is necessary. It would be cost prohibitive to have one out of every five calls completed, which is typical, while having the calling agents dealing with all these other non-productive things.

A disadvantage of predictive dialing systems is that, for the casual user or the intermittent user, such systems are generally too expensive to cost justify. To own and maintain a predictive dialing system on premise is very expensive. Even a small present day system costs a great deal, and the cost increases with the inclusion of additional agent positions. Such a system is a capital cost in which most casual or intermittent users are unable or unwilling to invest.

One solution available to the intermittent user, such as one who has a calling campaign that runs once or twice a year, is to contract out the calling campaigns to a service bureau having the necessary equipment and personnel. Here the user provides the service bureau with information, such as names and numbers of target persons to contact as well as scripted dialogue to be used upon contact, and the service bureau executes the campaign for them with their own agent staff and their own predictive dialing system. Thereafter, the service bureau presents the user with the results of the particular calling campaign.

One drawback of the service bureau arrangement is that all contact with the target parties, presumably customers or other individuals upon which the user wishes to make a favorable impression, has been placed with the agents of the service bureau. Although the user typically provides a script from which to orchestrate the contact, there may be instances where the dialogue does not cover the situation, thus requiring a call back or otherwise incomplete contact. Such an incomplete contact at the very least causes inefficiency in the system, and quite possibly leaves a less than favorable impression on the individual so handled.

Furthermore, the service bureau agents are not directly accountable to the user. These agents have not been specifically screened or chosen by the user for representation in what quite possibly could be the only contact between the user and the contacted individual. Therefore, there is a possibility of improper representation of the user, over which the user has no direct control or ability to remedy.

One solution to the above-discussed problem is to use a network based system and to use individuals working remotely from their homes or offices. In such a system, the network application places calls based upon data supplied by an organization. When the network system detects that a live person has answered (as apposed to a no-answer or to an answering machine) the network then connects the call through to one of the remote based agents.

One problem with such an approach is that the called party may have caller ID which identifies the calling party. In the scenario just mentioned the calling party will be calling on behalf of an agency (for example, a particular charity) and the caller ID at the called party's end will show the caller's home phone number and his/her name, or will show the identity of the network based system. The caller ID will not, however, show the identity of the charity. This, of course, is not a good situation.

Even in the situation where a conventional predictive dialing bureau makes the phone calls for "house" agents, the caller ID of the called station will show the ID of the calling bureau and not the ID of the organization for which the calls are being placed.

This problem is also present with any central based application that places, or routes, calls for another party or in situations where a party uses his/her home telephone to make a call that is better identified as coming from the real party in interest. For example, in a work-at-home situation where a party makes calls on behalf of an employer, or, for example, a law enforcement person makes a call from a private telephone, it is not appropriate (and indeed counterproductive) to have the called party's caller ID display the identity of the actual station from which the call was placed.

Simply blocking the outgoing caller ID is not the solution since many people now block all incoming calls where the called party's ID has been withheld. Also, when soliciting for a charity, the natural skeptism of the called party as to the true identity of the caller will be reduced if the charity's name were to appear on the caller ID.

Thus, there is a need in the art for a system in which the caller ID of a called party shows the real party in interest to that call and not the ID of the station from which the call was placed.

A further need in the art is for such a system in which any substitute caller ID is screened for permission on a call by call basis.

Accordingly, a further need exists in the art for a such a system which may be cost effectively utilized by the casual or intermittent user.

A further need exists in the art for such a system allowing communication by agents located geographically remote from the organization from which they are calling.

Yet a further need in the art exists for a system which allows agents to utilize general purpose information communication devices to contact target parties, while preserving their caller ID private.

SUMMARY OF THE INVENTION

These and other objects, needs and desires are obtained in one embodiment having a system and method for providing a predictive dialer in combination with a call management system which is networked, to allow the predictive dialer to be centrally located, such as at a service provider's location, for cost effective utilization by a number of remote users. As each call is placed, the caller ID for the particular agent handling the call is replaced with a caller ID from a database.

In an alternative embodiment, a caller from a station having a caller ID will have the calling station's normal ID changed to reflect another entity. This change, if desired, can be by permission only.

The call management system of one embodiment of the present invention provides an interface between the user and the predictive dialer. This interface allows for the input, via a supported network, of calling information, such as target names, phone numbers (or other electronic addresses), street addresses, calling agent identification, etcetera, and presents information to the user regarding call management, such as calling statistics, calls completed, system utilization, individual agent utilization, etcetera.

Network interfaces provided by the networked predictive dialing system may take the form of any means capable of transmitting desired information. For example, call list information, such as target names and numbers, may be generated on a general purpose computer, such as a PC, and communicated to the call management system via proprietary link, local or wide area network, or via modem and public switched telephone network (PSTN). Additionally, such information may be faxed or E-mailed, such as by the Internet or PSTN, into the call management system. Likewise, the same information may be reduced to hard copy and mailed to a service provider who then inputs the information by hand or electronically, such as by a scanner and optical character recognition system (OCR). Preferably, the information so provided is arranged in a predetermined format to enable the call management system to readily utilize the provided information. However, as the information typically will comprise such readily identifiable components as name, phone number or electronic message address, and street address, the call management system could be provided with logic to utilize such information provided in any format.

Similarly, information generated by the networked predictive dialing system may be communicated to the user through any available means. Typically, call management information will be provided the user via the same means that the user provides the system with information. However, it shall be appreciated that the user may provide information by one means and the call management system by another.

After entry of calling information within the call management system, regardless of the means by which it was entered, the predictive dialer is supplied with information, from the call management system, sufficient to enable its dialing of individual targets according to the user's desires. Thereafter, individual agents of the user may access the predictive dialer, via a network connection, to handle calls completed by the predictive dialer.

Agents utilizing the system may use any suitable means, including general purpose communications devices, for communication with the targets to whom calls have been completed. Some of the general purpose phone technologies that are available, for example, Radish Voice View technology or ADSI screen phone technology, provide for display of information such as that provided with the call list. For instance, the target's or user's name, or some other pertinent information, could be displayed on the telephone device, or the attached PC in the case of the Radish Voice View, as the call is completed. These, as well as other available technologies, provide the agent with additional information about the call to which he is being connected.

In addition to advantages realized by the ability of agents to connect to, and thereby utilize, the predictive dialer by various connection means, advantages are realized by the ability of these agents to be geographically dispersed from each other as well as the predictive dialing system itself. The networked predictive dialing system treats agents connected to it, regardless of their geographic proximity, as a pool of agents. This allows both agents in a central location and/or agents working separately, such as at home, to participate in an agent pool and thus achieve system efficiency.

In addition to advantages available from the agents being geographically dispersed, pooling of these agents also provides economy in that the number of agents or their associated network elements need not be constant throughout the entire campaign. Agents may enter and exit the system as desired or needed, such as at peak times, without the need to constantly staff a particular location. Furthermore, as different networking means may be utilized, economy may be realized by utilization of more expensive agent equipment, such as the Radish Voice View or ADSI screen phone technologies, only at the number of agent network elements typically kept occupied. As additional agents are utilized, such as at peak times, lesser expensive agent network elements may be used, such as analogue telephone sets to handle the swell.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 6 shows a typical database used to change the ID of a calling station under certain situations.

DESCRIPTION OF THE PREFERRED EMBODIMENTS

Figure 1:
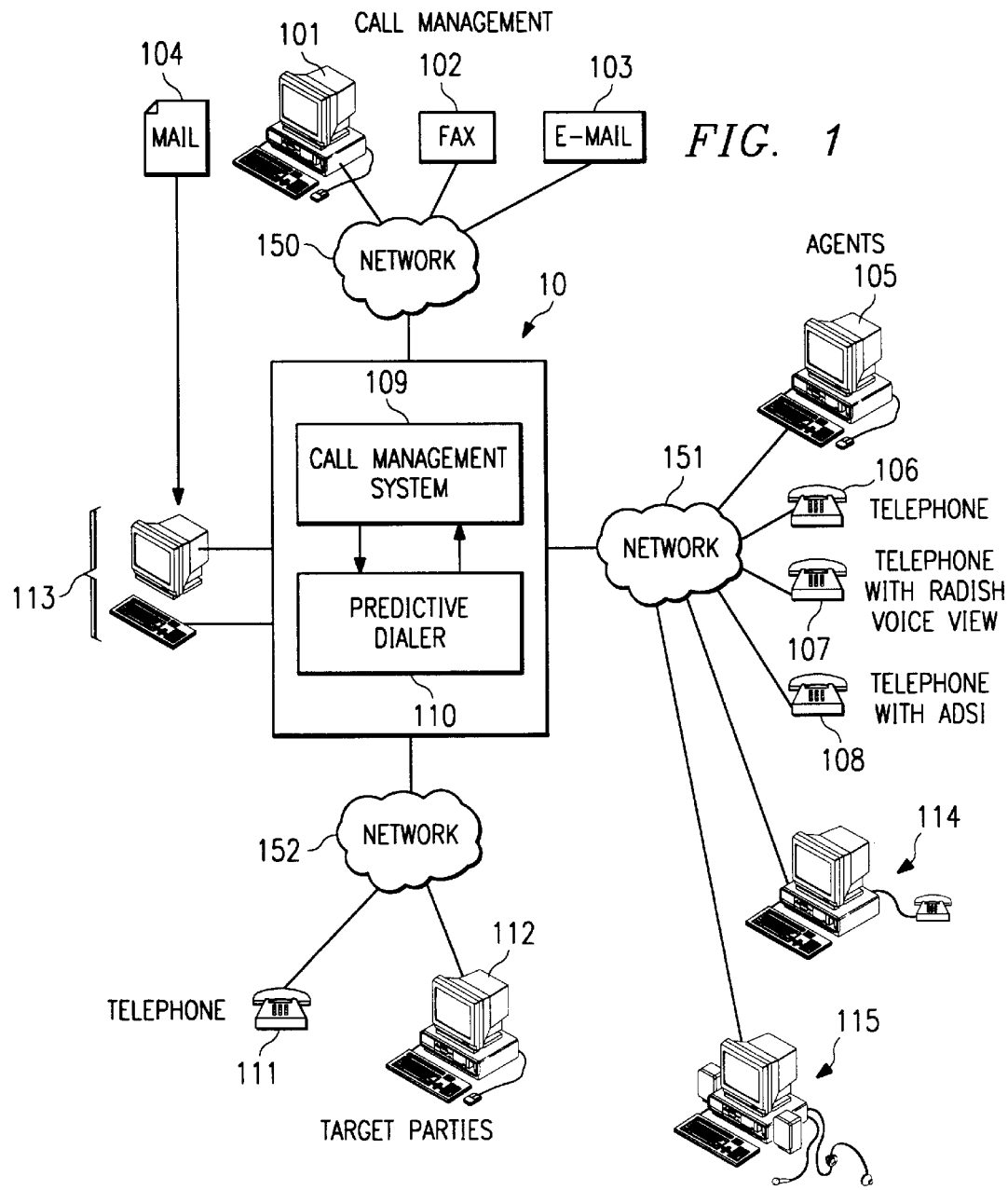
FIG. 1 illustrates networked predictive dialing system 10 of the present invention and its interconnection to various networks and network elements.

The present invention allows for the provision of a predictive dialer system by a service provider to users of such systems, while still allowing the user to utilize his/her own agents in the calling process. Moreover, as access to the predictive dialer is provided via network connections, the agents so utilizing the system may be geographically dispersed from the system and each other. Furthermore, network interfaces of the present invention may be utilized to provide varying means for both the input of information regarding target individuals to be contacted and subsequent connection of call management information to the user regarding these contacts.

To aid in the understanding of the present invention, a scenario describing its utilization is offered. In our example, a group is trying to organize a high school reunion. Typically such an event would begin with a paper list of classmates, here a list of 1200 people, including their names and phone numbers. This paper list could be divvied up amongst several persons organizing the event, but contacting these individuals in this manner is very inefficient. The callers are going to encounter the same kind of problems any mass phone campaign encounters. They are going to get answering machines, ringing with no answer, and busy signals interspersed with the desired actual live contact. This leads to both wasted time of the individual phone agents as well as management problems in keeping an accurate record of who has been successfully contacted.

Because this is not a reoccurring function that these individuals will be involved in, specialized telephony equipment, such as a predictive dialer is not an economical alternative. Therefore, an ideal situation would be for this group to have a central facility having predictive dialing capabilities make the calls so that they may make efficient use of their phone agent's time as well as make the calls in a orderly manner.

The present invention provides a system including a centralized predictive dialer which is accessible to calling agents of a user through network connections. In utilizing this invention in the above example, the list of classmates would be downloaded to the system, such as, for example, by fax. Thereafter, the calling agent, could pickup their home phone, call into the system, provide an access code, and then the system would begin placing calls in a predictive manner to the 1200 parties on the list.

Only live answered calls are connected to calling agents. Answering machines will be detected and a pre-recorded message from the reunion committee could be laid down on the answering machines. All busy and ring no answer calls could be retried automatically at some pre-determined rate.

This system provides a novel method by which calling agents may participate in a calling campaign while being geographically separated and without the need for specialized agent communications equipment. Furthermore, each of these geographically separated calling agents are treated as a pool of agents. This allows greater flexibility in forming a pool of agents than has previously been known in the art. For example, agents could be across the nation in different time zones as necessary.

Furthermore, this system may be utilized with any number of phone or communication technologies that are available or are later to be developed, including general purpose communications devices. For instance, Radish Voice View technology, ADSI screen phone technology, or another device providing a display means, each allowing for the provision of information to the calling agent regarding the contacted individual, such as the contact's name or some other pertinent information displayed on the telephone device or an attached PC, may be used. Likewise, multimedia PCs, or Internet based telephones, such as those disclosed in co-pending patent application Ser. No. 08/719,163, entitled "INTERACTIVE INFORMATION TRANSACTION PROCESSING SYSTEM WITH UNIVERSAL TELEPHONY GATEWAY CAPABILITIES," having a common assignee, which is hereby incorporated herein by reference, may be used. Similarly, an agent could use an automatic number identification (ANI) unit, which is a fairly inexpensive unit, to display useful information. An alternative implementation uses text to speech technology in pre-announcing the call prior to connection to a calling agent.

Moreover, communications equipment without the capability of audio communication could be utilized where, for example, target parties are to be contacted through non-audio means. Of course, through the use of text to speech technology, any combination of agent and target party audio/non-audio communications may also be accomplished through the present invention. A system for providing information communication between such varied communications means is disclosed in the above referenced co-pending application.

Directing attention to FIG. 1, there is depicted system 10 of the present invention. System 10 includes call management system (CMS) 109 and predictive dialer 110. CMS 109 and predictive dialer 110 are systems that may be embodied in a processor-based system such as a general purpose computer, a PC, a server class microcomputer, a minicomputer or a mainframe computer. However, it shall be understood that CMS 109 and predictive dialer 110 may assume other forms, such as being embodied in separate systems coupled to function according to the present invention. For example, a call management system and various related hardware may be adapted for coupling to an independently functional prior art predictive dialer to result in a system according to the present invention.

Figure 2:
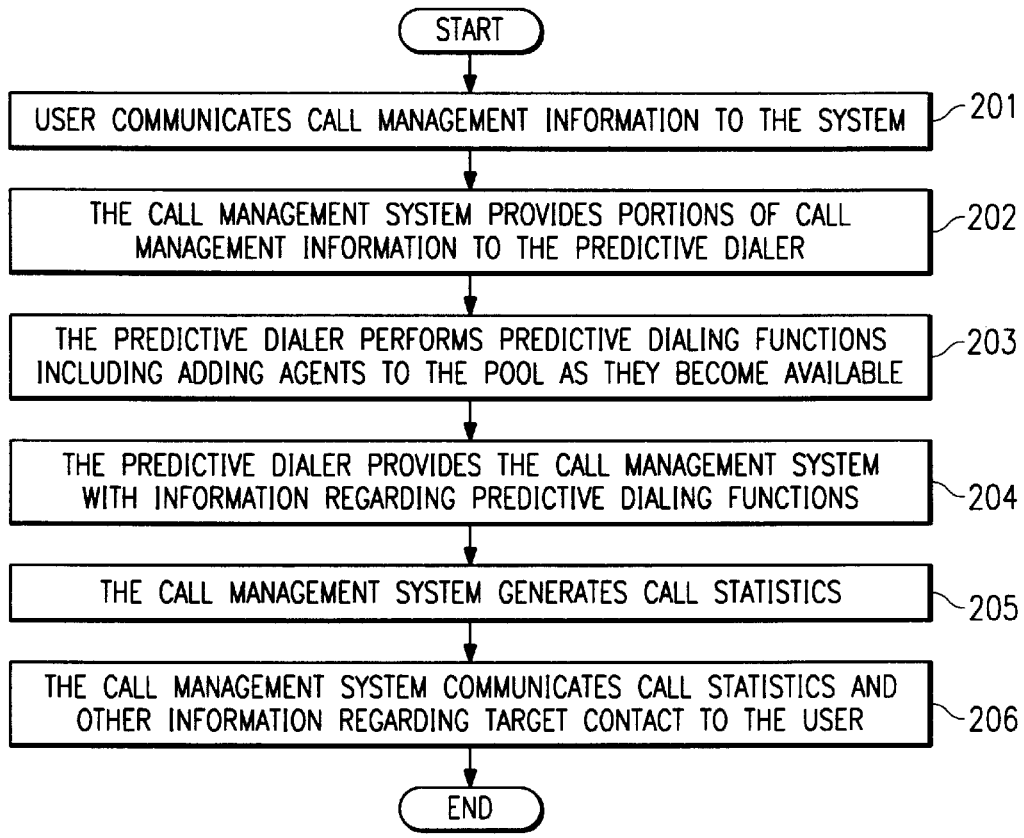
FIG. 2 illustrates a flow diagram of utilization of the present invention.

FIG. 2 illustrates a flow diagram of how CMS 109 and predictive dialer 110 of system 10 interact according to the present invention. As shown in steps 201 and 202, call management information is communicated to CMS 109. Thereafter, CMS 109 provides predictive dialer 110 with portions of the call management information sufficient to enable predictive dialer 110 to contact targets (step 203). Predictive dialer 110 in turn provides information regarding its efforts to contact targets to CMS 109 (step 204). CMS 109 utilizes this information to generate call statistics which may be ultimately communicated to the user (steps 205 and 206). Additional aspects of this flow diagram are detailed in FIGS. 3–5 described herein.

Referring again to FIG. 1, CMS 109 comprises a data processing environment executing within processor-based system 10. Coupled to system 10, and in information communication with CMS 109, are telephony and or communication devices such as fax, e-mail, modem or terminal access devices (not shown). These devices provide access to various coupled networks, such as network 150, to CMS 109 through which information communication may be accomplished with various network elements utilized by the user of system 10.

Network elements 101 through 104 depicted as interfaced with system 10 through network 150 are suitable for use as call management network elements. These elements are desirable for utilization in management of calls by the user of the predictive dialer, as, for example, in inputting information, such as calling lists and identification of agents, as well as outputting of information by CMS 109, such as calling statistics. However, it shall be understood that ones of these network elements may be equally adaptable for use by agents notwithstanding their use in call management functions. Likewise, devices depicted as agent or target party communication devices may be equally adaptable for use in call management.

It shall be understood that network 150 may comprise any means of information communication, such as a PSN, a computer network, or the Internet, suitable for providing information communication between a particular network element and system 10. Information communication may be accomplished through network 150, for example, by such communication protocols as facsimile, file transport protocol (FTP), hypertext markup language (HTML), telephony audio communication, or the like. Furthermore, although multiple call management network elements are illustrated connected to network 150, it shall be appreciated that ones of the network elements may be connected to different networks.

Figure 3:
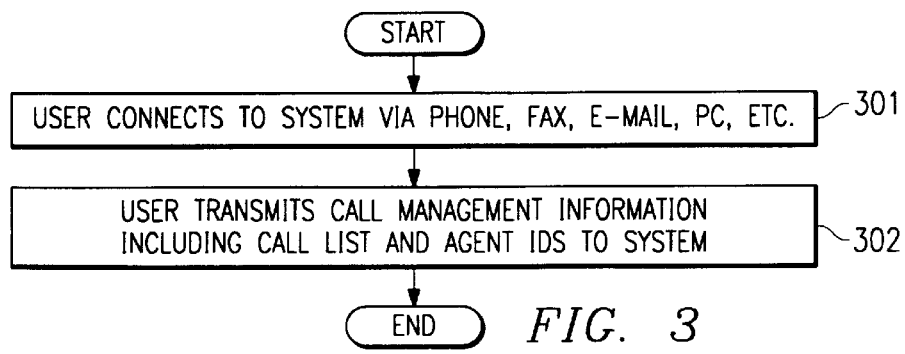
FIGS. 3–5 illustrate detailed flow diagrams of particular portions of the flow diagram illustrated in FIG. 2.

FIG. 3 illustrates a typical flow diagram of a user utilizing a call management network element, such as network elements 101 through 104. It shall be appreciated that the flow diagram illustrated in FIG. 3 is a detail of steps consistent with that represented by step 201 of FIG. 2.

At step 301 the user connects to system 10 by utilizing an available network element communicating through a network coupled to system 10, such as network 150 illustrated in FIG. 1. Thereafter, the user transmits call management information to system 10 (step 302). It shall be appreciated that system 10 may accept and store more than one set of call management information. Such sets of call management information may be utilized to perform predictive dialing functions for different users simultaneously or serially.

The call management information provided to system 10 includes a call list of desired addresses to contact and may also include such information as the identification of agents authorized to access system 10 or times at which to perform predictive dialing functions. It shall be understood that the desired addresses to contact, or target addresses, includes such addressing schemes as telephone number, e-mail messaging address, Internet address, and the like.

A call management network element, such as, for example, PC 101, could be coupled to CMS 109 in a real time or non-real time link to download information, such as a calling list or other relevant information, to the call management system as well as to retrieve calling statistics from CMS 109. This call management network element may be coupled to CMS 109 by any means suitable for information communication between the two systems, such as a PSN, computer network system, dedicated communication lines, proprietary interface and connection, or even the Internet. Furthermore, it shall be appreciated that information transmitted to and received from CMS 109 may be utilized directly or indirectly by applications executed by PC 101.

In utilizing fax 102 for call management purposes, a user may simply transmit call list information to CMS 109 in the form of a facsimile. Like PC 101, fax 102 may also be used by CMS 109 to transmit statistics and call completion information from CMS 109 to the user. It shall be understood that fax 102 may be in the form of a "stand alone" fax machine, accepting and printing hard copy images, or may be a fax device coupled to a processor-based system. Utilization of a fax device coupled to a processor-based system provides means by which another application executing on the processor-based system may generate, accept and utilize the information so transmitted.

Box 103 represents an E-mail system utilized for the purpose of sending call list information and retrieving statistical information from the call management system. Box 104, standard mail, is similarly utilized and could be a form, for example, that is mailed to the service provider listing the electronic addresses to be contacted and other pertinent information, such as name and street address of the party to be contacted. It shall be appreciated that in order to be input into CMS 109, mail 104 must be converted into electronic information. Therefore, system 10 may include input/output means such as keyboard and display device 113 to allow an operator to input information transmitted by mail 104. Of course, input/output means coupled to system 10 may take the form of an optical scanner and OCR system (not shown) to eliminate the need for operator entry of information transmitted by mail 104, if desired.

It shall be appreciated that each of these network elements may be used in the alternative to, or in conjunction with, any of the other network elements. For example, a user of system 10 may provide a call list to a service provider operating system 10 via mail 104 and thereafter be provided call statistics from CMS 109 via fax 102. Similarly, a user may provide and/or receive portions of the information via several different network elements.

Although varying means for inputting to and receiving information from CMS 109 are shown, the substance of the information provided to and from each such means is substantially the same. For example, the information provided CMS 109 electronically by PC 101 is substantially the same as information provided CMS 109 in hard copy form by mail 104.

In addition to accepting and transmitting call management information to the aforementioned call management network elements, CMS 109 is adapted to manipulate that information into a format suitable for use within the networked predictive dialing system and/or predictive dialer 110. In the preferred embodiment, the information provided CMS 109 by network elements 101–104 is formatted in a predetermined manner to present information necessary to the operation of predictive dialer 110 in a readily usable fashion. Such formatting may take different forms in the various network elements because of their differing embodiments. However, the information so presented is substantially the same. For example, PC 101 and e-mail 103 may present the information in the form of a comma delimited database of predetermined format while fax 102 and mail 104 present the same information in a predetermined tabular form.

Of course, the format of information provided CMS 109 could be relaxed to comprise any logical method of communication of such information, if desired. However, the less standardized the methods of provision of such information are allowed to take, the more complex the algorithm required to present this information to the predictive dialer in an acceptable fashion must necessarily become.

CMS 109 is coupled to predictive dialer 110 to provide electronic addresses, included in the call management information received by CMS 109, to be contacted by predictive dialer 110. Thereafter, predictive dialer 110 communicates information to CMS 109 about the status of particular calls, whether the call resulted in a ring no answer, a busy signal, a call completion, etcetera. That information can then be consolidated, stored, or manipulated in CMS 109 for the purpose of relaying this call management information to the user by the methods previously discussed.

Predictive dialer 110 comprises a telephony peripheral performing functions that are well known in the industry.

Specifically, predictive dialer 110 calls ahead of an agent's availability in anticipation of an agent becoming available, screens out calls resulting in no answer, busy signals, or otherwise unproductive calls, as well as intercepting voice mail and answering machines and handling those in an automated fashion. Such a predictive dialer is disclosed in co-pending application Ser. No. 08/543,010, entitled "SYSTEM AND METHOD FOR AN IMPROVED PREDICTIVE DIALER," which application is incorporated herein by reference. The result of predictive dialer 110's operation is that targets indicated by a user are contacted, with only live answered calls being passed to available calling agents.

It shall be appreciated that predictive dialer 110 may include any number of subsystems well known in the art, such as a call control algorithm, telephone switching algorithm, or a statistical engine. Predictive dialer 110 may also include other ancillary technology such as voice recognition, text to speech, interactive voice response (IVR) and other technologies typically encountered in call processing systems or otherwise used therewith.

Again referring to FIG. 1, network elements 105 through 108, 114 and 115, illustrated interfaced with system 10 through network 151, are suitable for use as agent network elements. These elements are desirable for utilization by the agents in communicating with target parties contacted by the predictive dialer. However, it shall be understood that ones of these network elements may be equally adaptable for use by a user in the management of calls from system 10 or by a target party in receiving a call.

Network elements 105 through 108, 114 and 115 not only provide means by which an agent may be placed in communication with a party contacted by the predictive dialer, but also provide means by which information may be communicated to/from system 10 itself. Such information may include, for example, the agent transmitting information identifying him/herself to system 10 for access to system 10 and subsequent inclusion in an agent pool, or may include information identifying a particular target contacted by predictive dialer 110.

It shall be understood that network 151, like network 150, may comprise any means of information communication, such as a PSN, a computer network, or the Internet, suitable for providing information communication between a particular network element and system 10. Although multiple agent network elements are illustrated connected to network 151, it shall be appreciated that ones of the network elements may be connected to a different network. Furthermore, although call management network elements 101 through 104 and agent network elements 105 through 108, 114 and 115 are illustrated as coupled to system 10 through separate networks, these network elements may in fact be intermingled on one or more networks.

Moreover, multiple network elements may be used by a single agent in utilizing the present invention. For example, an agent may be placed in communication with a party contacted by the predictive dialer using one network element, while being provided information from system 10 itself by a different network element. It shall be appreciated that the various network elements so used by an agent may be coupled to system 10 by the same or different networks.

A standard telephone is illustrated as phone 106 which provides an agent with both voice communication capability as well as limited data transmission capability in the form of DTMF. Of course, this telephone may be analogue or may be digital, such as is common in cellular communications. Phone 106 may be utilized by the agent to gain access to system 10 as a pooled agent by identifying himself through information entered through a DTMF keypad or by uttering information to be recognized by voice recognition technology available to system 10. Thereafter, phone 106 may be utilized by the agent to communicate with a target contacted by predictive dialer 110.

In addition to the above mentioned standard telephone, various other communications devices may be utilized by an agent to both gain access to system 10 as a pooled agent as well as to communicate with a contacted target. For example, a Radish Voice View telephone (phone 107), an ADSI screen phone telephone (phone 108), and a processor-based system are all suitable for utilization by an agent. Illustrated as network elements 105, 114, and 115 are processor-based systems in three typical configurations. The processor-based system configuration illustrated as PC 105 provides information communication through a display device. Likewise PCs 114 and 115 provide information communication through a display device, but also provide audio information communication through such means as an attached communication device (PC 114) or multimedia equipment including a microphone and speaker (PC 115). However, it shall be understood that configurations in addition to those illustrated currently exist, or may later be developed, which are suitable for providing information communication through the present invention.

It shall be appreciated that within the call management information provided to system 10 the name of the person to contact, possibly their street address, and/or other pertinent information is available at system 10. This information may be stored in a call record associated with the call which is available as the predictive dialer places the call. System 10 may provide this information to an agent as a call is instigated or upon its completion.

Similarly, through the use of automatic number information (ANI), information regarding the target contacted is available to system 10 independent of the call management information, although not prior to instigating the call. ANI information may be used by system 10 in addition to, or in the alternative to, the call management information described above.

Information regarding the target contacted, regardless of its source being call management information or ANI information, may be transmitted to an agent prior to, or during, connection with the target in a number of ways. For example, with the ADSI telephone, phone 108, the target's name, street address, and other information can be displayed on a display device associated with phone 108. Alternatively, text to speech technology may be coupled to the predictive dialer to speak the information in the call record to the agent prior to the completion of the call. This method works equally well for agents utilizing a standard phone such as phone 106.

In the case of the use of Radish Voice View protocol, phone 107, essentially the same capabilities as with the ADSI phone, are available to visually display all of the caller information. Of course in the case of an attached PC, such as PCs 105, 114, and 115, a full screen interface capable of displaying the call record information is available.

In some applications of system 10, such as where the purpose of the call is to take an order or to place a reservation, information available at system 10, whether related to the called party or the calling party, could be utilized by a process other than those associated with the predictive dialing function, such as a word processor, spread sheet, accounting program or data base. For example, where the purpose of the call is to take an order, the contacted target's name and address may be ported into a common data base such as that associated with an order entry application. This common database may be located centrally, such as within system 10 or coupled thereto, or may be local to the agent, such as within PC 105, depending upon the user's needs and desires.

Figure 4:
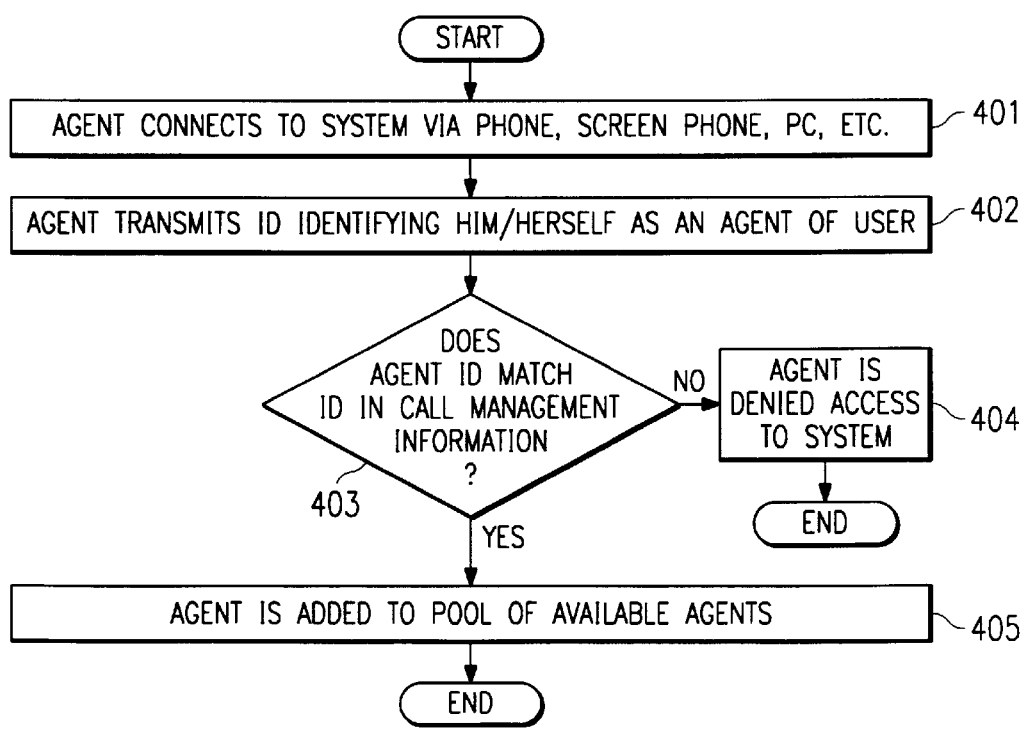

Directing attention to FIG. 4, there is illustrated a flow diagram of an agent connecting to system 10. It shall be appreciated that the steps illustrated in FIG. 4 are a detail of steps included in step 203 of FIG. 2.

Upon an agent contacting system 10 through one of the network devices 105 through 108 or 114 through 115 (step 401), the agent may log into the system by entering a user authorization ID matching information provided as call management information (step 402). Provided the ID indicates the agent is authorized (step 403), system 10 may add this agent to the pool of agents available for handling calls completed by predictive dialer 110 (step 405). However, if the ID does not indicate the agent is authorized the agent is denied access to system 10 (step 404).

Of course, limiting agent access to those pre-authorized, as indicated by call management information, may be omitted, if desired. For example, where access to the various network connections of system 10 is itself restricted, it may be desirable to allow any agent having access to be pooled by the present invention.

It shall be appreciated that system 10 may have stored therein more than one calling list to be predictively dialed simultaneously and, therefore, an agent may be added to a pool associated with a particular calling list. For example, where two calling lists from two different users are simultaneously being predictively dialed by system 10, depending upon the user to which an agent is associated she/he may be placed in a pool of agents associated with a particular calling list. Association of the agent to a particular user or calling list may be accomplished by use of the ID information entered in step 402. Alternatively, additional information identifying the agent to a particular user or calling list may be used, if desired. Of course, where multiple calling lists stored within system 10 are all associated with a single user, a single pool of available agents may be used to communicate with contacted targets regardless of which calling list initiated the contact.

It shall be understood that the number of agents that may be pooled by system 10 is limited only by the bandwidth of the network connections to system 10 and the number of agents authorized by the user. Typically, the larger the pool, the more even the statistical distribution across the pool is and, thus, the more efficient the utilization of each agent's time.

Moreover, any of the agent network elements may be used in the alternative to, or in conjunction with, any of the other network elements available to agents. For example, multiple agents using system 10 may communicate to called parties through standard telephones, such as that illustrated as phone 106. Additionally, some agents using system 10 may communicate to called parties through ADSI telephones, such as illustrated as phone 108, or through processor based systems, such as illustrated as PCs 105, 114 and 115.

Figure 5:
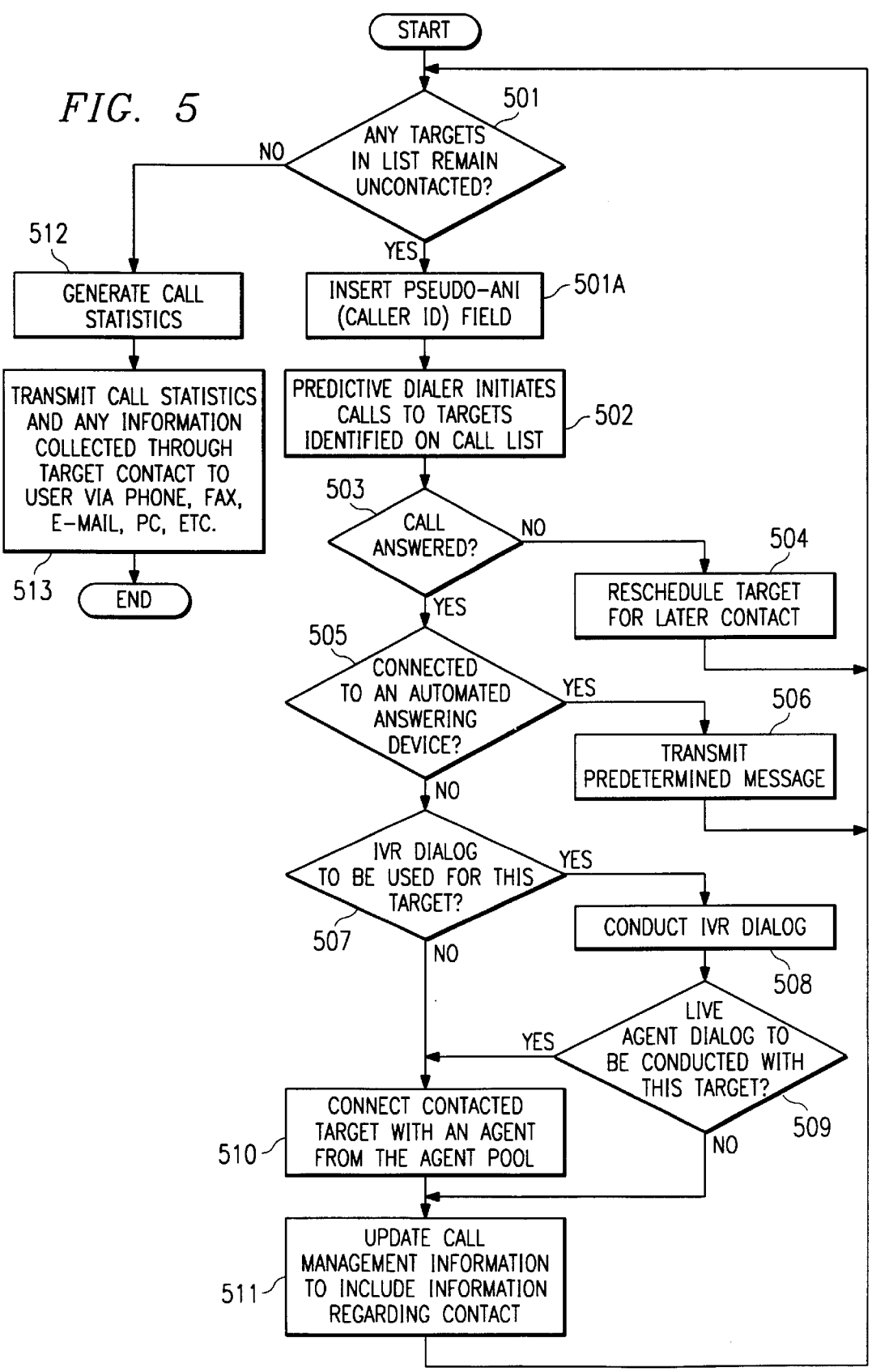

Directing attention to FIG. 5, there is illustrated a flow diagram of predictive dialing and associated functions by system 10. It shall be appreciated that the steps illustrated in FIG. 5 are a detail of steps included in steps 204 through 206 of FIG. 2.

After call management information is provided by the user to system 10, predictive dialer 110 may begin calling the target parties indicated in the call management information (steps 501–503). Of course where an agent is required for live communication with a target party, predictive dialer 110 may postpone initiating calls until an authorized agent is connected to system 10 and added to the agent pool.

There may be times that it is desirable to change the field referred to generally as ANI or "caller ID field" on the originating call. This change would be made to change the ANI field to reflect the particular institution that is sponsoring the call. Thus, as shown in box 501A, if someone is calling from his/her home on a collections campaign or a fundraising campaign, that person does not necessarily want his/her home phone number to show up on the called parties caller ID. Instead, it is desired to use the phone number of the organization that the person is calling on behalf of to show up in the caller ID field of the called party. There are a number of ways to do this. If the system that the caller is using is ISDN-connected, feature group D, trunking arrangement, SS-7 ISUP, and a number of others, it is possible to alter that field, inserting an alternate, or what we refer to as a "pseudo" ANI from a database into that field prior to call placement. An ISUP is an ISDN user port, one of the alternate APIs and SS-7 used primarily for caller setup and teardown. The pseudo ANI would be stored in a campaign definition database. When the fundraising, or other campaign, puts together its call list, it includes a code that identifies the calling station as a valid customer and a code that identifies the institution they are calling on behalf of. The database will have other specifics such as the phone number of the institution.

When the caller is calling from home and it is desired to use the caller ID number of a third party, database 601 would be entered, perhaps under control of a special dialed code, and by using the caller ID number as an address into a database.

FIG. 6 is the database definition for the campaign database. On a callback call basis, any of the phone calls associated with a particular campaign, the ANI (5), or when desired the pseudo ANI (6) can be taken from the database and inserted in the field for call placement.

In situations where there is no actual "campaign," but the caller's ID is to be changed, a similar ID substitution can be made. However, while not shown, the existing ANI of the caller would be matched against a database using the ANI as an address. This match could be triggered, for example, by the dialing of a special code, or by the insertion of a code in the ANI at the calling station. There can be security codes added to insure that improper users do not have their IDs changed. Alternatively, a caller could simply have a PIN which is used (and matched against a database of valid PIN's) to change IDs. This would allow police officers (for example) to call from any phone and the recipient would "see" the ID of the police department. A database lookup, as shown in FIG. 6 would be used for such purposes. The ID change can be made for one call or for a campaign of calls, depending upon the authorization level established for the PIN. In some situations, for example, for a person working at home, the caller ID can be set to be changed during "working" hours only. This could be automatic five days a week.

Referring again to FIG. 1, phone 111 and PC 112, illustrated coupled to system 10 through network 152, are suitable for contacting target parties. However, it shall be understood that ones of these network elements may be equally adaptable for use by a user in the management of calls from system 10 or by an agent in communicating through the system. Likewise, network elements illustrated as call management or agent network elements in FIG. 1 may be equally suitable for use by target parties to provide information communication.

It shall be understood that network 152, like networks 150 and 151, may comprise any means of information communication, such as a PSN, a computer network, or the Internet, suitable for providing information communication between a particular network element and system 10. Moreover, although multiple target party network elements are illustrated connected to network 152, it shall be appreciated that ones of the network elements may be connected to different networks. Furthermore, although call management network elements 101 through 104, agent network elements 105 through 108, 114 and 115 and target party network elements 111 and 112 are illustrated as coupled to system 10 through separate networks, these network elements may in fact be intermingled on one or more networks.

It shall be appreciated that contacting target parties may be accomplished through traditional communications means, such as phone 111, or may be accomplished through other communications technologies, such as PC 112. It shall be understood that PC 112 may comprise any number of configurations such as, for example, a multimedia PC or a PC with telephony equipment attached thereto. Depending on the configuration of the target party's network element, contact by predictive dialer 110 may be via full duplex communication such as is available with multimedia PCs, or by half duplex communication means, such as e-mail.

The means by which target parties are contacted depends in part upon the address information provided system 10 as call management information. For example, if a phone number is listed as an address entry in the call management information, predictive dialer will attempt to contact that target by phone.

Similarly, if an Internet address is listed as an address entry in the call management information, the predictive dialer will attempt to contact the target via the Internet. However, as some types of communications, such as Internet communication, may occur in various forms, call management information may also include such information as an indication of whether the contact should be made as a full duplex real-time conversation, or some other communication method. Alternatively, system 10 may initiate contact and poll the target party's network element in order to determine the proper method of communication.

There is no restriction on the target party as long as they are included in a dialing plan that fits the communication capabilities of predictive dialer 110, i.e., the address indicated in the call management information is one that the predictive dialer is capable of contacting.

After initiating a call by whatever means, predictive dialer 110 determines if the call is answered (step 503). If the call is not answered, system 10 reschedules the particular target for a later attempt (step 504). However, if the call is answered, predictive dialer 110 determines if the call is being answered by an automated answering device (step 505). It shall be appreciated that methods for determining the presence of an automated answering device are notoriously well known in the art and, therefore, will not be discussed in detail here. However, the preferred embodiment detects a tone signal transmitted from an automated answering device in order to determine that the communication has not been answered by a human.

In the case of encountering an answering machine at phone 111 or an unattended or half duplex system at PC 112, a predetermined message may be transmitted to these devices by system 10 (step 506). Such messages may be provided to system 10 by various methods. For example, the user of the system may provide a textual message in the call management information by any of the devices 101 through 104. This message may be transmitted to the contacted target in its original form or may be converted to an audio signal by text to voice technology available at system 10. Additionally, such messages may be provided by any of the devices of 105 through 108, 114 and 115 in the form of a prerecorded message to be laid down on all answering devices, so the agent on devices 105 through 108, 114 and 115 are not required to speak that message to every answering machine.

It shall be appreciated that, because system 10 may comprise communication technology in addition to, or integral to, predictive dialer 110, functions beyond the predictive dialing of targets and their subsequent connection to an agent may be performed. For example, where interactive voice response (IVR) capabilities are available, system 10 may perform some highly automated voice transactions with the contacted target after establishing the connection.

A conversation could in essence take place between the contacted target and system 10. For example, using IVR technology in combination with recording responses from the contacted target, it is unnecessary for any agent to communicate with anyone live. A session may be conducted with a prerecorded message using voice mail boxes, well known in the art, tied to the individual call records to record responses associated with the particular contacted target. Thereafter, such as when predictive dialer 110 completes the calls indicated by the call management information, these responses may be picked up by an agent or user of system 10. This allows the individual retrieving the responses to utilize the recorded information in various ways, such as update a record associated with the contacted target or if need be, initiate a call through system 10 to talk to someone live to get more information. Alternatively, depending on the contacted target's responses, system 10 may connect an agent from the pool to the contacted target, or may otherwise communicate specific information to an agent or the user.

If interactive voice response is to be utilized, whether as an alternative to, or in addition to, a live agent, predictive dialer 110 conducts the IVR dialogue after determining a live target has answered (steps 507 and 508). If an IVR dialogue is not to be conducted, or the IVR dialogue is completed and live dialogue is to take place, system 10 establishes a link between the contacted target and an available agent in the pool of agents via network devices 105 through 108, 114 and 115 (steps 509 and 510). Thereafter, either party hanging up will terminate the call and information regarding the call will be updated in CMS 109 (step 511). Predictive dialer 110 will again return to step 501 upon completion of a call.

It shall be appreciated that information regarding a contacted target, such as responses to IVR dialogue or the date and duration of the contact, for example, may be recorded locally at the user's location, such as on network elements 101 through 103. Alternatively, information regarding contact of a target may be centrally recorded, such as within system 10 or within a computer network coupled thereto. Thereafter this information may be downloaded on a periodic basis to the user either in the form of electronic transfer or paper transfer, such as through network elements 101–104.

Upon completion of predictive dialing functions by predictive dialer 110, CMS 109 generates call statistics and communicates these statistics along with other desired call information to the user (steps 512 and 513). Of course, call statistic information, as well as the other desired information, may be communicated to the user at any desired interval, if desired. For example, upon completion of a predetermined number of calls, system 10 may immediately communicate information regarding these contacts to the user.

It shall be appreciated that by utilizing the above disclosed features in various combinations, system 10 may function in various ways depending on a user's needs and desires.

Although the present invention and its advantages have been described in detail, it should be understood that various changes, substitutions and alterations can be made herein without departing from the spirit and scope of the invention as defined by the appended claims.

What is claimed is:

1. A telephone calling system in which calls are placed to called parties and where each such placed call is connected for communication purposes to a calling party having a particular caller identification, said system comprising:

call placement means for placing said calls to said called parties and for connecting said calls to said calling party; and means for substituting a preselected caller identification for said calling party's particular caller identification, wherein said substituting means is operative based upon the time of day.

2. The invention as set forth in claim 1 further comprising: database means containing at least one caller identification, and wherein said substituting means includes:

means for identifying certain calling parties based upon the caller identification of the calling party.

3. The invention as set forth in claim 2 wherein said identifying means further includes:

means for inhibiting said substituting means based upon a call by call determination.

4. The invention as set forth in claim 2 wherein said identifying means further includes:

means for maintaining said identification for a period of time.

5. The invention as set forth in claim 4 wherein said substituting means is further operative based upon the day of the week.

6. The invention as set forth in claim 1 wherein said substituting means is located at said call placement means.

7. A method for placing calls to called parties by a telephone network based control system and for connecting said calls for communication purposes to a calling party having a particular caller identification; the method comprising the steps of:

placing said calls to said called parties from a call placement means;

connecting said called parties to said calling party; and substituting a preselected caller identification for said calling party's particular caller identification, wherein the step of substituting operates based upon the time of day.

8. The method as set forth in claim 7 further comprises the step of:

storing, in a database, at least one caller identification, and wherein the step of substituting includes the step of:

identifying certain calling parties based upon the caller identification of the calling party.

9. The method as set forth in claim 8 wherein, the step of identifying comprises the step of:

inhibiting the step of substituting based upon a call by call determination.

10. The method as set forth in claim 8 wherein, the step of identifying comprises the step of:

maintaining the step of identifying for a period of time.

11. The method as set forth in claim 10, wherein the step of substituting further operates based upon the day of the week.

12. The method as set forth in claim 7, wherein the step of substituting is performed at said network.

13. A system for initiating a plurality of information communication contacts from a centralized location, said information communication contacts being directed to a plurality of predetermined target addresses, said system comprising:

means for receiving, at said centralized location, a set of communication parameters including said plurality of target addresses and corresponding information identifying individual agents authorized to communicate with ones of said plurality of target addresses;

means for initiating said information communication contacts to said plurality of target addresses from said centralized location;

means for storing information associated with said communication initiation;

means for identifying a plurality of general purpose communication devices located geographically distant from said centralized location as at least one group of agent devices; and means for providing information communication between a contacted one of said plurality of target addresses and one or more agent devices from said group of agent devices, said information communication adapted to allow said one or more agent devices to communicate through said system with said contacted one of said plurality of target addresses, and;

means for adjusting the caller identification of said one or more agent devices.

14. The invention as set forth in claim 13 wherein said adjusting means includes a database of substitute agent identifications.

15. The invention as set forth in claim 13 wherein said adjusting means includes means for determining if a certain agent's identification should be adjusted.

16. A system for initiating a plurality of information communication contacts with a plurality of target addresses, said system comprising:

call management means for storing a set of communication parameters including said plurality of target addresses and corresponding information identifying individual agents authorized to communicate with ones of said plurality of target addresses;

predictive dialing means for initiating said information communication contacts to said plurality of target addresses, said predictive dialing means being coupled to said call management means to provide information communication therebetween;

a first network means for providing information communication between said system and one or more agents located geographically distant from said system, said information communication provided by said first network means adapted to allow said one or more agents to communicate through said system using ones of a plurality of general purpose communications devices, and means for adjusting the calling identification of said one or more agents.

17. The system as set forth in claim 16, wherein at least one of said general purpose communications devices is selected from the group consisting of:
    a screen telephone;
    a digital telephone;
    an analogue telephone; and
    a general purpose processor-based system.

18. The system as set forth in claim 16, wherein said first network means comprise a plurality of network links, and ones of said agents communicate through said first network means utilizing differing ones of said network links.

19. The system as set forth in claim 16, wherein ones of said network links comprise network protocols different from others of said network links.

20. The system as set forth in claim 16, wherein said first network means comprise an information communication link selected from the group consisting of:
    a public switched network;
    a satellite system;
    a cable system;
    a computer network; and
    the Internet.

21. The system as set forth in claim 16, further comprising verifying means for limiting access to said system by agents to only those agents identified in said communication parameters.

22. The system as set forth in claim 16, further comprising interactive response means for querying a target network element contacted at ones of said plurality of target addresses.

23. The system as set forth in claim 22, further comprising means for recording responses to said query.

24. The system as set forth in claim 23, wherein at least a portion of information received in response to said query is communicated to a select agent of said agents.

25. A method for initiating a plurality of information communication contacts from a centralized location, said information communication contacts being directed to a plurality of predetermined target addresses, said method comprising the steps of:
    receiving, at said central location, a set of communication parameters including said plurality of target addresses and corresponding information identifying individual agents authorized to communicate with ones of said plurality of target addresses;
    initiating said information communication contacts to said plurality of target addresses from said centralized location;
    storing information associated with said communication initiation;
    providing information communication between contacted ones of said plurality of target addresses and one or more agents located geographically distant from said centralized location, said information communication adapted to allow said one or more agents to communicate through said system using a general purpose communication device, and
    adjusting the caller identification of said one or more agents prior to connecting said agents through said system.

26. The method as set forth in claim 25, wherein said general purpose communication device is selected from the group consisting of:
    a screen telephone;
    a digital telephone;
    an analogue telephone; and
    a general purpose processor-based system.

27. The method as set forth in claim 26, wherein at least one agent of said agents communicates with said centralized location through an information communication link selected from the group consisting of:
    a public switched network;
    a satellite system;
    a cable system;
    a computer network; and
    the Internet.

28. The method as set forth in claim 25, wherein said adjusting step includes the step of:
    obtaining a caller identification from a database assorted with a particular set of initiated contacts.

29. The method as set forth in claim 25, wherein said adjusting step includes the step of
    obtaining a caller identification from a database controlled in part by said stored information.

30. The method as set forth in claim 25, further comprising the step of verifying authorized access of agents permitting access only to those agents identified in said communication parameters.

31. The method as set forth in claim 25, further comprising the step of querying a contacted target address of said plurality of target addresses according to a predetermined dialogue.

32. The method as set forth in claim 25, wherein said communication parameters are initially communicated from a location geographically distant from said centralized location.

33. The method as set forth in claim 32, wherein said communication parameters are communicated through a link utilizing a proprietary network protocol.

34. A networked system for initiating a plurality of outbound information communication contacts directed to a plurality of predetermined target network elements connectable to said system through a network, ones of said communication contacts to be handled by one or more agent network elements connected to said system through said network, said system comprising:
    a centralized communication apparatus comprising:
        call management means for receiving a set of communication parameters including said plurality of target network elements, said call management means also for generating communication information comprising information associated with said system initiating contact with said plurality of target network elements; and
        communication means for initiating said outbound information communication contacts to said plurality of target network elements, said communication means being in information communication with said call management means, said communication means adapted for interfacing said one or more agent network elements and a contacted one of said predetermined plurality of target network elements;
    at least one call management network element connectable to said communication apparatus through said network, said call management network element being suitable for communicating a set of communication parameters to said call management means through said network;

at least one agent network element connectable to said communication apparatus through said network, said at least one agent network element comprising a general purpose information communication device, said agent network element being suitable for information communication with at least one target network element of said plurality of target network elements, said agent network element also being suitable for information communication with said communication apparatus;

at least one target network element connectable to said communication apparatus through said network, and means for adjusting the caller ID of said one agent network element as it appears on a display at said target network element.

35. A telephone calling system in which calls are placed to called parties and where each such placed call is connected for communication purposes to a calling party having a particular caller identification, said system comprising:

a predictive dialer for placing said calls to said called parties and for connecting said calls to said calling party; and means for substituting a preselected caller identification for said calling party's particular caller identification.

36. A method for placing calls to called parties by a telephone network based control system and for connecting said calls for communication purposes to a calling party having a particular caller identification; the method comprising the steps of:

placing said calls to said called parties from a predictive dialer;

connecting said called parties to said calling party; and substituting a preselected caller identification for said calling party's particular caller identification.

* * * * *